United States Patent
Jin

(10) Patent No.: US 9,317,928 B2
(45) Date of Patent: *Apr. 19, 2016

(54) DETECTING AND TRACKING POINT FEATURES WITH PRIMARY COLORS

(71) Applicant: Adobe Systems Incorporated, San Jose, CA (US)

(72) Inventor: Hailin Jin, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/514,820

(22) Filed: Oct. 15, 2014

(65) Prior Publication Data

US 2015/0030206 A1    Jan. 29, 2015

Related U.S. Application Data

(63) Continuation-in-part of application No. 13/725,019, filed on Dec. 21, 2012, now Pat. No. 8,873,846.

(60) Provisional application No. 61/621,365, filed on Apr. 6, 2012.

(51) Int. Cl.
*G06K 9/00* (2006.01)
*G06T 7/20* (2006.01)
*G06K 9/64* (2006.01)
*G06K 9/46* (2006.01)

(52) U.S. Cl.
CPC .............. *G06T 7/204* (2013.01); *G06K 9/4652* (2013.01); *G06K 9/64* (2013.01); *G06T 2207/10016* (2013.01); *G06T 2207/10024* (2013.01); *G06T 2207/30241* (2013.01); *G06T 2207/30244* (2013.01)

(58) Field of Classification Search
USPC ......... 382/162, 165, 201, 203, 107, 100, 103, 382/232, 285, 218; 345/419; 315/364; 375/E7.086, E7.193; 701/300; 708/5, 708/420
See application file for complete search history.

(56) References Cited

U.S. PATENT DOCUMENTS

| | | |
|---|---|---|
| 4,885,713 A | 12/1989 | Miller |
| 5,692,063 A | 11/1997 | Lee et al. |
| 5,748,789 A | 5/1998 | Lee et al. |

(Continued)

OTHER PUBLICATIONS

"Notice of Allowance", U.S. Appl. No. 13/724,906, Mar. 11, 2015, 4 pages.

(Continued)

*Primary Examiner* — Anh Do
(74) *Attorney, Agent, or Firm* — Wolfe-SBMC

(57) ABSTRACT

A feature tracking technique for detecting and tracking feature points with primary colors. An energy value may be computed for each color channel of a feature. If the energy of all the channels is above a threshold, then the feature may be tracked according to a feature tracking method using all channels. Otherwise, if the energy of all of the channels is below the threshold, then the feature is not tracked. If the energy of at least one (but not all) of the channels is below the threshold, then the feature is considered to have primary color, and the feature may be tracked according to the feature tracking method using only the one or more channels with energy above the threshold. The feature tracking techniques may, for example, be used to establish point trajectories in an image sequence for various Structure from Motion (SFM) techniques.

20 Claims, 5 Drawing Sheets

(56) References Cited

U.S. PATENT DOCUMENTS

| | | | |
|---|---|---|---|
| 5,787,203 | A | 7/1998 | Lee et al. |
| 6,760,488 | B1 | 7/2004 | Moura et al. |
| 6,970,591 | B1 | 11/2005 | Lyons et al. |
| 7,177,740 | B1 | 2/2007 | Guangjun et al. |
| 7,356,082 | B1 | 4/2008 | Kuhn |
| 7,477,762 | B2 | 1/2009 | Zhang et al. |
| 8,248,476 | B2 | 8/2012 | Ke et al. |
| 8,259,994 | B1 | 9/2012 | Anguelov et al. |
| 8,437,501 | B1 | 5/2013 | Anguelov et al. |
| 8,693,734 | B2 | 4/2014 | Jin |
| 8,873,846 | B2 * | 10/2014 | Jin .................. H04N 5/232 382/162 |
| 8,923,638 | B2 | 12/2014 | Jin |
| 8,934,677 | B2 | 1/2015 | Jin |
| 8,942,422 | B2 | 1/2015 | Jin |
| 9,083,945 | B2 | 7/2015 | Jin |
| 9,131,208 | B2 | 9/2015 | Jin |
| 2003/0103682 | A1 | 6/2003 | Blake et al. |
| 2006/0159308 | A1 | 7/2006 | Hampapur et al. |
| 2008/0043848 | A1 | 2/2008 | Kuhn |
| 2010/0079598 | A1 | 4/2010 | Ke et al. |
| 2010/0142846 | A1 | 6/2010 | Tolliver et al. |
| 2010/0245593 | A1 | 9/2010 | Kim et al. |
| 2011/0007138 | A1 | 1/2011 | Zhang et al. |
| 2011/0025853 | A1 | 2/2011 | Richardson |
| 2011/0064308 | A1 | 3/2011 | Stein et al. |
| 2011/0311104 | A1 | 12/2011 | Sinha et al. |
| 2013/0044186 | A1 | 2/2013 | Jin et al. |
| 2013/0044913 | A1 | 2/2013 | Jin et al. |
| 2013/0058581 | A1 | 3/2013 | Zhang et al. |
| 2013/0230214 | A1 | 9/2013 | Arth et al. |
| 2013/0265387 | A1 | 10/2013 | Jin |
| 2013/0265439 | A1 | 10/2013 | Jin |
| 2013/0265443 | A1 | 10/2013 | Jin |
| 2013/0266179 | A1 | 10/2013 | Jin |
| 2013/0266180 | A1 | 10/2013 | Jin |
| 2013/0266218 | A1 | 10/2013 | Jin |
| 2013/0266238 | A1 | 10/2013 | Jin |
| 2015/0249811 | A1 | 9/2015 | Jin |
| 2015/0317802 | A1 | 11/2015 | Jin |

OTHER PUBLICATIONS

"Notice of Allowance", U.S. Appl. No. 13/724,945, Apr. 22, 2015, 6 pages.
"Supplemental Notice of Allowance", U.S. Appl. No. 13/724,906, May 5, 2015, 2 pages.
"Non-Final Office Action", U.S. Appl. No. 13/724,906, Oct. 16, 2014, 8 pages.
"Non-Final Office Action", U.S. Appl. No. 13/725,006, Aug. 15, 2014, 5 pages.
"Notice of Allowance", U.S. Appl. No. 13/724,871, Sep. 18, 2014, 6 pages.
"Notice of Allowance", U.S. Appl. No. 13/724,973, Oct. 9, 2014, 7 pages.
"Notice of Allowance", U.S. Appl. No. 13/725,006, Sep. 2, 2014, 7 pages.
"Notice of Allowance", U.S. Appl. No. 13/725,019, Jun. 23, 2014, 7 pages.
"Supplemental Notice of Allowance", U.S. Appl. No. 13/724,871, Oct. 14, 2014, 2 pages.
"Supplemental Notice of Allowance", U.S. Appl. No. 13/724,871, Nov. 24, 2014, 2 pages.
"U.S. Application as Filed", U.S. Appl. No. 13/300,277, Nov. 18, 2011, 40 pages.
"U.S. Application as Filed", U.S. Appl. No. 13/551,601, Jul. 17, 2012, 80 pages.
"U.S. Application as Filed", U.S. Appl. No. 13/551,603, Jul. 17, 2012, 78 pages.
Baillard,"Automatic Reconstruction of Piecewise Planar Models from Multiple Views", Proceedings of IEEE Conference on Computer Vision and Pattern Recognition, 1999, 7 pages.
Bartoli,"Constrained Structure and Motion from Multiple Uncalibrated Views of a Piecewise Planar Scene", IJCV—International Journal of Computer Vision, vol. 52, No. 1, Apr. 2003, 42 pages.
Bocquillon,"Towards a Guaranteed Solution to Plane-Based Self-Calibration", ACCV, 2006, 11 pages.
Brown,"Minimal Solutions for Panoramic Stitching", In Proc. of IEEE Conf. on Computer Vision and Pattern Recognition, 2007, 8 pages.
Chum,"Two-View Geometry Estimation Unaffected by a Dominant Plane", Proceedings of IEEE Conference on Computer Vision and Pattern Recognition (CVPR), 2005, 8 pages.
Engels,"Bundle Adjustment Rules", Photogrammetric Computer Vision (PCV'06), 2006, 6 pages.
Fischler,"Random sample consensus: a paradigm for model fitting with applications to image analysis and automated cartography", Communications of the ACM, 24(6):381-395, Jun. 1981, pp. 381-395.
Fouhey,"Multiple Plane Detection in Image Pairs Using J-Linkage", Proceedings of the 20th International Conference on Pattern Recognition (ICPR 2010), Istanbul, Turkey, Aug. 2010, 4 pages.
Fraundorfer,"Piecewise Planar Scene Reconstruction from Sparse Correspondences", Image and Vision Computing 24(4), 2006, pp. 395-406.
Gherardi,"Practical Autocalibration", ECCV, 2010, 12 pages.
Gurdjos,"Methods and Geometry for Plane-Based Self-Calibration", CVPR, 2003, 6 pages.
Hartley,"Multiple View Geometry", CVPR, Jun. 1999, 240 pages.
Hemayed,"A Survey of Camera Self-Calibration", Proceedings of IEEE Conference on Advanced Video and Signal Based Surveillance, 2003, 7 pages.
Jin,"Real-Time Feature Tracking and Outlier Rejection with Changes in Illumination", Computer Vision, ICCV, Proceedings of 8th IEEE International Conference, vol. 1, 2001, 12 pages.
Kanazawa,"Detection of Planar Regions with Uncalibrated Stereo Using Distributions of Feature Points", British Machine Vision Conference (BMVC), Kingston upon Thames, London, vol. 1, Sep. 2004, 10 pages.
Kaucic,"Plane-Based Projective Reconstruction", Proceedings of International Conference on Computer Vision, 2001, 8 pages.
Kneip,"A Novel Parametrization of the Perspective-Three-Point Problem for a Direct Computation of Absolute Camera Position and Orientation", Proceedings of IEEE Computer Vision and Pattern Recognition, 2011, 8 pages.
Longuet-Higgins,"The Visual Ambiguity of a Moving Plane", Proceedings of the Royal Society Biological Sciences, 223, 1984, pp. 165-175.
Lopez-Nicolas,"Computing Homographies from Three Lines or Points in an Image Pair", ICIAP '05 Proceedings of the 13th International Conference on Image Analysis and Processing, 2005, 9 pages.
Lourakis,"Detecting Planes in an Uncalibrated Image Pair", BMVC '02, vol. 2, 2002, pp. 587-596.
Lourakis,"The Design and Implementation of a Generic Sparse Bundle Adjustment Software Package Based on the Levenberg-Marquardt Algorithm", Technical Report 340, Institute of Computer Science—FORTH (2004), 2004, 23 pages.
Lucas,"An Iterative Image Registration Technique with an Application to Stereo Vision", Proceedings of 7th International Joint Conference on Artificial Intelligence (LICAI), Aug. 24-28, 1981, Vancouver, British Columbia, Aug. 24, 1981, pp. 674-679.
Lucas,"An Iterative Image Registration Technique with an Application to Stereo Vision", Proceedings of Imaging Understanding Workshop, 1981, pp. 121-130.
Ma,"An Invitation to 3-D Vision from Images to Models", Springer-Verlag, New York, 2004, Nov. 19, 2001, 338 pages.
Malis,"Camera Self-Calibration from Unknown Planar Structures Enforcing the Multi-View Constraints between Collineations", PAMI 24(9), 2002, 18 pages.
Menudet,"Plane-Based Camera Self-Calibration by Metric Rectification of Images", Image and Vision Computing 26, 2008, pp. 913-934.

(56) References Cited

OTHER PUBLICATIONS

Nister,"An efficient solution to the five-point relative pose problem", IEEE Trans. on Pattern Analysis and Machine Intelligence, 26(6):756-777, Jun. 2004, 17 pages.
Piazzi,"Plane Detection with Stereo Images", Proceedings of the 2006 IEEE International Conference on Robotics and Automation, Orlando, FL, May 2006, 6 pages.
Pollefeys,"Self-Calibration and Metric Reconstruction in Spite of Varying and Unknown Intrinsic Camera Parameters", International Journal of Computer Vision 32(1), 1998, 18 pages.
Pollefeys,"Surviving Dominant Planes in Uncalibrated Structure and Motion Recovery", Proceedings of European Conference on Computer Vision, 2002, 14 pages.
Pollefeys,"Visual Modeling with a Hand-Held Camera", International Journal of Computer Vision, vol. 59(3), 2004, 52 pages.
Prankl,"Incremental Model Selection for Detection and Tracking of Planar Surfaces", Proceedings of British Machine Vision Conference, 2010, 1 page.
Rother,"Linear Multi-View Reconstruction of Points, Lines, Planes, and Cameras Using a Reference Plane", Proceedings of International Conference on Computer Vision, 2003, 8 pages.
Shi,"Good Features to Track", 1994, IEEE Conference on Computer Vision and Pattern Recognition, 593-600., 1994, 8 pages.
Snavely,"Modeling the World from Internet Photo Collections", International Journal of Computer Vision, vol. 80, Issue 2, Available at <http://phototour.cs.washington.edu/ModelingTheWorld_ijcv07.pdf>, Nov. 2008, 22 pages.
Sturm,"On Plane-Based Camera Calibration: A General Algorithm, Singularities, Applications", CVPR, 1999, 8 pages.
Szeliski,"Geometrically Constrained Structure from Motion: Points on Planes", European Workshop on 3D Structure from Multiple Images of Large-Scale Environments (SMILE), Nov. 11, 1998, 23 pages.
Torr,"The Problem of Degeneracy in Structure and Motion Recovery from Uncalibrated Image Sequences", 1999, International Journal of Computer Vision 32, 1, 27-44., 1999, 20 pages.
Triggs,"Autocalibration from Planar Scenes", Proceedings of European Conference on Computer Vision (ECCV), 1998, 20 pages.
Triggs,"Bundle adjustment- a modern synthesis", In Proc. Inti. Workshop on Vision Algorithms: Theory and Practice, pp. 298-372, 1999, 75 pages.
Tsai,"Estimating Three-Dimensional Motion Parameters of a Rigid Planar Patch, II: Singular Value Decomposition", IEEE Transactions on Acoustics, Speech, and Signal Processing, vol. ASSP-30, No. 4, Aug. 1982, pp. 525-534.
Vincent,"Detecting Planar Homographies in an Image Pair", International Symposium on Image and Signal Processing and Analysis, 2001, pp. 182-187.
Waxman,"Contour Evolution, Neighborhood Deformation, and Global Image Flow: Planar Surfaces in Motion", The International Journal of Robotics Research 4(95), Sep. 1, 1985, 15 pages.
Weng,"Motion and Structure from Point Correspondences with Error Estimation: Planar Surfaces", IEEE Transactions on Signal Processing, vol. 39, No. 12, Dec. 1991, pp. 2691-2717.
Zhang,"Robust Bundle Adjustment for Structure from Motion", Proceedings of the International Conference on Image Processing (ICIP), 2006, 4 pages.
"Corrected Notice of Allowance", U.S. Appl. No. 13/724,973, Dec. 24, 2014, 2 pages.
"Final Office Action", U.S. Appl. No. 13/724,906, Feb. 23, 2015, 7 pages.
"Non-Final Office Action", U.S. Appl. No. 13/725,041, Aug. 21, 2015, 12 pages.
"Non-Final Office Action", U.S. Appl. No. 14/801,432, Sep. 14, 2015, 6 pages.
"Notice of Allowance", U.S. Appl. No. 14/801,432, Nov. 6, 2015, 4 pages.
"Supplemental Notice of Allowance", U.S. Appl. No. 13/724,945, Jun. 26, 2015, 2 pages.
"Supplemental Notice of Allowance", U.S. Appl. No. 13/724,945, Aug. 5, 2015, 3 pages.
"Final Office Action", U.S. Appl. No. 13/725,041, Feb. 16, 2016, 17 pages.
"Supplemental Notice of Allowance", U.S. Appl. No. 14/801,432, Feb. 22, 2016, 2 pages.
"Corrected Notice of Allowance", U.S. Appl. No. 14/801,432, Dec. 4, 2015, 2 pages.

* cited by examiner

DETECTING AND TRACKING POINT FEATURES WITH PRIMARY COLORS

PRIORITY INFORMATION

This application claims benefit of priority of U.S. patent application Ser. No. 13/725,019, filed Dec. 21, 2012, entitled "Detecting and Tracking Point Features with Primary Colors" which claims benefit of priority of U.S. Provisional Application Ser. No. 61/621,365 entitled "Structure from Motion Methods and Apparatus" filed Apr. 6, 2012, the content of each of which are incorporated by reference herein in their entirety.

BACKGROUND

Description of the Related Art

In computer vision, inferring rigid-body motions of a camera from a video or set of images is a problem known as Structure from Motion (SFM). In SFM, a task or goal is to estimate the camera motion from a set of point correspondences in a set of images or video frames. Obtaining Structure from Motion (SFM) algorithms is of importance because a successful SFM algorithm would enable a wide range of applications in different domains including 3D image-based modeling and rendering, video stabilization, panorama stitching, video augmentation, vision based robot navigation, human-computer interaction, etc.

SUMMARY

Embodiments of feature tracking techniques are described that may be used to establish point trajectories over time in an input image sequence. The point trajectories may, for example, be used as input to a Structure From Motion (SFM) technique. Embodiments of the feature tracking techniques may detect features with primary colors and deal with them properly. Embodiments of the feature tracking techniques may be used in or with any method or technique that may be applied to image sequences and that requires point trajectories.

In at least some embodiments of a feature tracking technique for detecting and tracking feature points with primary colors, an energy value may be computed for each color channel of a feature. If the energy of all the channels is above a threshold, then the feature may be tracked according to a feature tracking method using all channels. Otherwise, if the energy of all of the channels is below the threshold, then the feature is not tracked. If the energy of at least one (but not all) of the channels is below the threshold, then the feature may be tracked according to the feature tracking method using only the one or more channels with energy above the threshold.

Embodiments of the feature tracking techniques may, for example, be used to establish point trajectories in an image sequence for various embodiments of Structure from Motion (SFM) techniques and algorithms that may be applied, for example, to find the three-dimensional (3D) structures of a scene, for example from a video taken by a moving video camera or from a set of images taken with a still camera. In SFM, a task or goal is to estimate the camera motion (which may, but does not necessarily, have both translation and rotation components) from a set of point correspondences in a set of images or video frames. In addition, in at least some cases, intrinsic camera parameters (e.g., focal length) may also be estimated if not known. Performing the task of estimating camera motion and intrinsic parameters for a frame or a sequence of frames may be referred to as reconstruction. Thus, a reconstruction algorithm or technique (which may also be referred to as an SFM technique) may be implemented and applied to estimate the camera motion and intrinsic parameters for image sequences. Note that a distinct camera may be assumed for each image or frame in an image sequence. Thus, each frame or image in a sequence may be referred to as a "camera."

Figure 1:
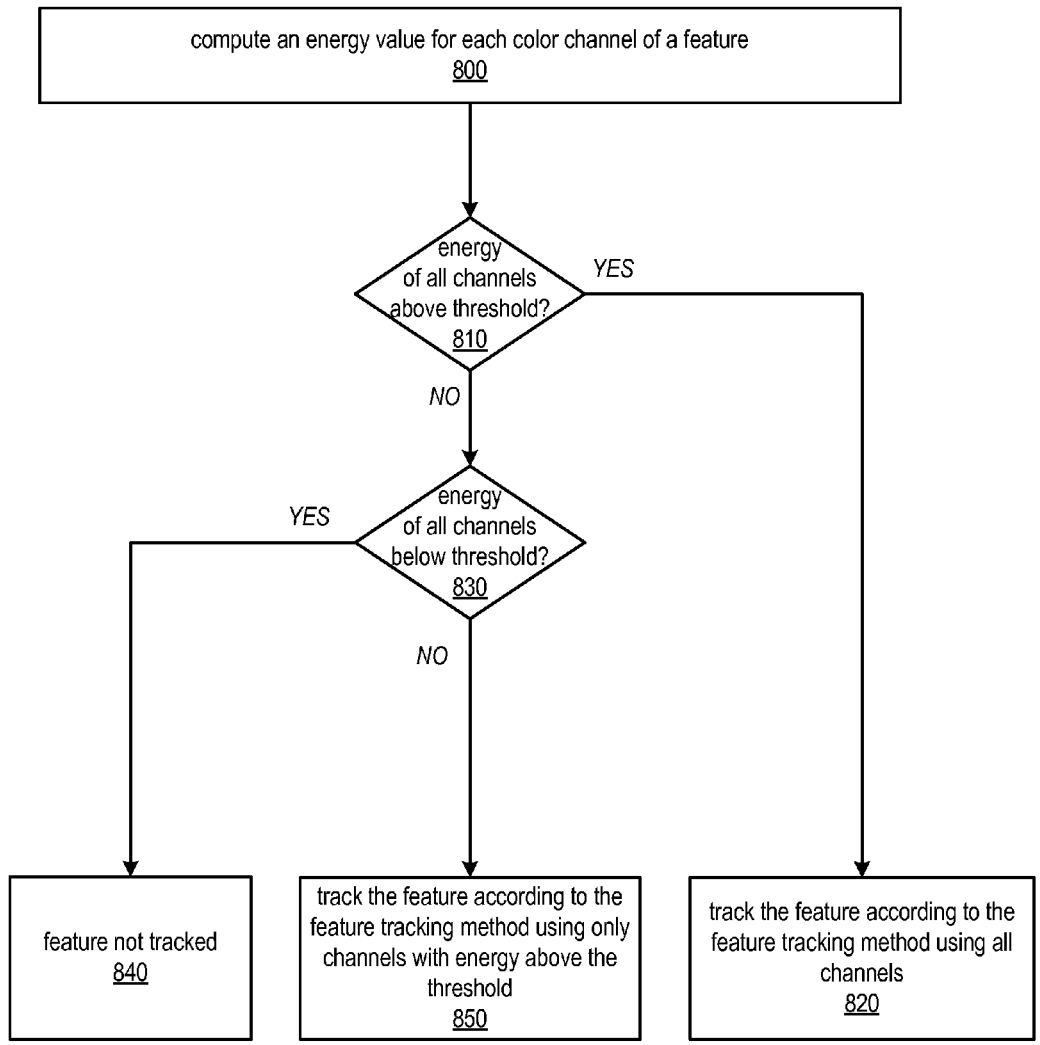
FIG. 1 is a flowchart of a feature point detection and tracking technique, according to at least some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of feature tracking techniques are described that may be used to establish point trajectories over time in an input image sequence. The feature tracking technique may detect features with primary colors and deal with them properly. The point trajectories may, for example, be used as input to Structure From Motion (SFM) reconstruction techniques. However, note that embodiments of the feature tracking techniques may be used in or with any method or technique that may be applied to image sequences and that requires point trajectories.

Detecting and Tracking Feature Points with Primary Colors

Embodiments of feature tracking techniques are described that may be used to establish point trajectories over time in an input image sequence. In at least some embodiments, the feature tracking technique may exclude low-energy channels when tracking a feature. If a feature has one or more low-energy channels, then for feature tracking to work robustly those channels should be excluded when tracking the feature, and only higher-energy channels (primary colors) should be used.

FIG. 1 is a high-level flowchart of an example method for detecting and tracking feature points with primary colors, according to at least some embodiments. As indicated at 800, an energy value may be computed for each color channel of a feature. At 810, if the energy of all the channels is above a threshold, then the feature may be tracked according to a feature tracking method using all channels, as indicated at 820. Otherwise, at 830, if the energy of all of the channels is below the threshold, then the feature is not tracked, as indicated at 840. At 830, if the energy of at least one (but not all) of the channels is below the threshold, then the feature may be tracked according to the feature tracking method using only the one or more channels with energy above the threshold, as indicated at 850.

The elements of FIG. 1 are explained in more detail below. Note that FIG. 1 is given as a non-limiting example, and that the method may be otherwise formulated.

Feature tracking is an important step in motion analysis for image sequences such as videos. A feature tracking technique generally establishes point-wise temporal correspondences across a set of images or video frames. Such point correspondences may be useful for high-level task such as structure from motion (SFM), video stabilization, panorama stitching, etc.

An important aspect of feature tracking is tracking a feature as long as possible. To achieve this, not only the domain deformation but also illumination changes may need to be modeled. In the section titled Feature tracking details, an algorithm is described that can do both. The illumination changes are typically modeled at a per-channel basis. There may be a problem if one of the channels is weak. For instance, if a black marker is being tracked on a green screen, the marker has information only in the green channel. Both red and blue at zero is the ideal case. In general, the red and blue channels contain nothing but image noise. In this case, neither the red nor the blue channel can be matched between two images. If the tracking algorithm is not aware of this problem, it may fail because it may not be able to infer the illumination parameters for the red and blue channels. However, there may be sufficient information in the green channel to infer both the deformation parameters and the illumination parameters for the green channel. Therefore, it is not that there is no information, but instead it is an incorrect choice of algorithm. In order to use the right algorithm, such a case needs to be detected.

Many conventional feature tracking techniques do not use illumination correction. As a result, these techniques are less sensitive to weak channels. Some conventional techniques may convert color images into gray-scale images, in which case the above-described problem becomes less severe. However, in either case, the tracking performance may suffer because of the simplifications.

Embodiments of an algorithm to detect and track feature points with primary colors are described. Embodiments of the feature tracking technique may detect features with primary colors and deal with them properly. In at least some embodiments, a feature is determined to have primary color if the energy of at least one, but not all, color channels is below a threshold. In at least some embodiments, features for which the energy of all color channels is below the threshold are discarded and not tracked. As a result, embodiments of the feature tracking technique may overcome the above-described problems in conventional techniques. In addition, embodiments of the feature tracking technique may be efficient; there may be little or no performance penalty in using embodiments of the described techniques.

Feature Tracking Details

The point tracking task may be defined as follows: given two images and a set of points in one image, determine which are the corresponding points in the other image in the sense of being the image projections of the same points in space.

An observation on this task is that correspondence may be ill-defined for a single intensity point, since many points that have the same intensities may exist in the second image. In addition, in the presence of image noise, a point with the closest intensity may not be the right point. A technique that may be used to address this problem in at least some embodiments is to define the correspondence problem for image regions instead of points.

Local Deformation Models

In defining point correspondence based on region correspondence, note that regions may deform their shape when viewed in a different image. This deformation may be denoted as h:

$$x_0 + w \Box h(x_0, w) \forall w \in W \qquad (C1)$$

Being a deformation, h exists in some space. Unfortunately, there is little structure for this space. Assuming images are continuous functions, then h lives in an infinite dimensional space. If images are assumed as discrete functions, then h lives in a space whose dimension is the same as the size of the window W.

Structures may be attached to h, i.e., parametric classes for h. A relatively simple one is the translational model:

$$h_T(x_0, w) = x_0 + w + d \,\forall w \in W, \quad \text{(C2)}$$

where $d \in \square^2$. It may be assumed that the window is just shifted with its shape and size fixed. A translation model (C2) can model a planar scene that is parallel to the image plane undergoing a translational motion that is also parallel to the image plane for perspective cameras. For affine cameras, translation model (C2) can model an arbitrary scene undergoing a translational motion that is parallel to the image plane.

A richer model is the affine model:

$$h_A(x_0, w) = Aw + x_0 + d \,\forall w \in W, \quad \text{(C3)}$$

where $A \in \square^{2 \times 2}$ and $d \in \square^2$. In this case, it may be assumed that the window shifts while rotating and scaling around this center. An affine model (C3) can model a planar scene that is parallel to the image plane undergoing an arbitrary translational motion and/or a rotational motion along the optical axis for perspective cameras. For affine cameras, affine model (C3) can model an arbitrary scene undergoing an arbitrary motion.

Even richer models such as the perspective model may be considered:

$$h_T(x_0, w) = \frac{Aw + B}{C^T w + 1} + x_0 \quad \text{(C4)}$$

$$\forall w \in W,$$

where $A \in \square^{2 \times 2}$ and $B, C \in \square^2$. A perspective model (C4) can model any planar scene undergoing an arbitrary motion.

Once a motion model is chosen, the tracking problem boils down to determining the parameters associated with the chosen model from the given images. In the next two sections, it is shown how this can be done for the translation model and the affine model, respectively.

Tracking with the Translation Model

Given two images I and J, and a point $x_0$ in I, a goal is to determine where this point is in J. Assuming the intensity of the window does not change from I to J, in at least some embodiments the answer may be obtained by solving the following optimization task:

$$\hat{d} = \operatorname*{argmin}_{d} \sum_{w \in W} \|I(x_0 + w) - J(x_0 + w + d)\| \quad \text{(C5)}$$

for some choice of the norm $\|\cdot\|$.

In at least some embodiments, the optimization task (C5) may be solved using an exhaustive search. An exhaustive search simply searches all possible values for d and finds the one with the minimum cost. This amounts to defining a search range and computing the cost for every d within this range. However, solving (C5) using an exhaustive search is computationally expensive. Moreover, solving (C5) using an exhaustive search does not generalize well with respect to the dimension of unknown parameters. For instance, in the affine case, there are six parameters, and therefore the search space is of dimension 6, which in practice is difficult if not impossible to search exhaustively.

In at least some embodiments, as an alternative to an exhaustive search, the optimization task (C5) may be solved using a differential search based on differential methods. A differential search may start by first approximating $J(x_0+w+d)$ with its first-order Taylor expansion:

$$J(x_0+w+d) \approx J(x_0+w) + \nabla J(x_0+w) \cdot d. \quad \text{(C6)}$$

The optimization problem becomes:

$$\hat{d} = \operatorname*{argmin}_{d} \sum_{w \in W} (I(x_0 + w) - J(x_0 + w) - \nabla J(x_0 + w) \cdot d)^2 \quad \text{(C7)}$$

for the $l^2$ norm. Note that the right hand-side of equation (C7) is quadratic in d. Therefore, in at least some embodiments, the optimal d may be found in closed form as follows:

$$d = \left( \sum_{w \in W} \nabla J(x_0 + w) \nabla J^T(x_0 + w) \right)^{-1} \quad \text{(C8)}$$

$$\left( \sum_{w \in W} (I(x_0 + w) - J(x_0 + w)) \nabla J(x_0 + w) \right)$$

Tracking with the Affine Model

In at least some embodiments, for the affine model, a similar procedure may be applied:

$$J(x_0 + w + d) \approx J(x_0 + w) + \nabla J(x_0 + w) \begin{bmatrix} w_1 & w_2 & 0 & 0 & 1 & 0 \\ 0 & 0 & w_1 & w_2 & 0 & 2 \end{bmatrix} D \quad \text{(C9)}$$

Where:

$$D \square [\, A_{11} \;\; A_{12} \;\; A_{21} \;\; A_{22} \;\; d_1 \;\; d_2 \,]^T,$$

$$A = \begin{bmatrix} A_{11} & A_{12} \\ A_{21} & A_{22} \end{bmatrix}$$

and $d = [d_1, d_2]^T$. Note that in this case an equivalent expression to equation (C3) may be used:

$$h_A(x_0, w) = x_0 + w + Aw + d \,\forall w \in W. \quad \text{(C10)}$$

D is a collection of the variables in A and d. Note the order of D and how it maps to A, as this may be important in determining the structure of the Jacobian in equation (C9). Let:

$$\nabla J(x_0+w) \square [\nabla I_1 \nabla I_2]^T$$

where arguments have been dropped for ease of notation. In at least some embodiments, the following may be obtained:

$$J(x_0+w+d) \approx J(x_0+w) + [\nabla I_1 w_1 \nabla I_1 w_2 \nabla I_2 w_1 \nabla I_2 w_2 \nabla I_1 \nabla I_2] D \quad \text{(C11)}$$

There is a quadratic energy in D, and in at least some embodiments the optimal may be given by:

$$D = \left( \sum_{w \in W} Q(w) \right)^{-1} \left( \sum_{w \in W} (I(x_0 + w) - J(x_0 + w)) P(w) \right) \quad \text{(C12)}$$

where P(w) is a 2×1 vector defined as follows:

$$P(w) = \begin{bmatrix} \nabla I_1 w_1 \\ \nabla I_1 w_2 \\ \nabla I_2 w_1 \\ \nabla I_2 w_2 \\ \nabla I_1 \\ \nabla I_2 \end{bmatrix} \quad (C13)$$

In at least some embodiments, Q(w) is a 2×2 symmetric matrix defined as follows:

$$Q(w) = P(w)P^T(w) \quad (C14)$$

$$= \begin{bmatrix} \nabla I_1^2 w_1^2 & \nabla I_1^2 w_1 w_2 & \nabla I_1 \nabla I_2 w_1^2 & \nabla I_1 \nabla I_2 w_1 w_2 & \nabla I_1 w_1^2 & \nabla I_1 w_1 w_2 \\ \nabla I_1^2 w_1 w_2 & \nabla I_1^2 w_2^2 & \nabla I_1 \nabla I_2 w_1 w_2 & \nabla I_1 \nabla I_2 w_2^2 & \nabla I_1 w_1 w_2 & \nabla I_1 w_2^2 \\ \nabla I_1 \nabla I_2 w_1^2 & \nabla I_1 \nabla I_2 w_1 w_2 & \nabla I_2^2 w_1^2 & \nabla I_2^2 w_1 w_2 & \nabla I_2 w_1^2 & \nabla I_2 w_1 w_2 \\ \nabla I_1 \nabla I_2 w_1 w_2 & \nabla I_1 \nabla I_2 w_2^2 & \nabla I_2^2 w_1 w_2 & \nabla I_2^2 w_2^2 & \nabla I_2 w_1 w_2 & \nabla I_2 w_2^2 \\ \nabla I_1 w_1^2 & \nabla I_1 w_1 w_2 & \nabla I_2 w_1^2 & \nabla I_2 w_1 w_2 & w_1^2 & w_1 w_2 \\ \nabla I_1 w_1 w_2 & \nabla I_1 w_2^2 & \nabla I_2 w_1 w_2 & \nabla I_2 w_2^2 & w_1 w_2 & w_2^2 \end{bmatrix}$$

Sub-Pixel Iterations

Taylor expansions only give an approximation. In at least some embodiments, the results obtained according to the above-described techniques may be improved by applying re-iterations, also referred to as sub-pixel iterations. A general idea is to apply the Taylor expansion around the previously found solution. For instance, in the case of the translation model:

$$J(x_0+w+d^n+\Delta d^n) \approx J(x_0+_w+d^n)+\nabla J(x_0+w+d^n)\cdot \Delta d^{n+1}, \quad (C15)$$

where $d^n$ is the optimal parameter found in the last iteration and $\Delta d^n$ is the intended update to $d^n$. In at least some embodiments, $\Delta d^n$ can be solved in a similar fashion as equation (C8):

$$\Delta d^n = \left( \sum_{w \in W} \nabla J(x_0 + w + d^n) \nabla J^T(x_0 + w + d^n) \right)^{-1} \times \quad (C16)$$

-continued $$\left( \sum_{w \in W} (I(x_0+w) - J(x_0+w+d^n))\nabla J(x_0+w+d^n) \right)$$

Once $\Delta d^n$ is computed, in at least some embodiments, the global transformation may be updated as follows:

$$\Delta d^{n+1} = d^n + \Delta d^n. \quad (C17)$$

In at least some embodiments, the algorithm may terminate if the norm of $\Delta d^n$ is smaller than a certain predefined value, for instance $\frac{1}{20}^{th}$ of a pixel.

In at least some embodiments, a similar sub-pixel iteration for affine models may be given by:

$$\Delta D^n \left( \sum_{w \in W} \Delta W(w) \right)^{-1} \left( \sum_{w \in W} (I(x_0+w) - J(x_0+w+A^n w+d^n))\Delta P(w) \right) \quad (C18)$$

where P(w) is a 2×1 vector defined as follows:

$$\Delta P(w) = \begin{bmatrix} \nabla I_1 w_1 \\ \nabla I_1 w_2 \\ \nabla I_2 w_1 \\ \nabla I_2 w_2 \\ \nabla I_1 \\ \nabla I_2 \end{bmatrix} \quad (C19)$$

In at least some embodiments, $\Delta Q(w)$ is a 2×2 matrix defined as follows:

$$\Delta Q(w) = \Delta P(w) \Delta P^T(w) \quad (C20)$$

$$= \begin{bmatrix} \nabla I_1^2 w_1^2 & \nabla I_1^2 w_1 w_2 & \nabla I_1 \nabla I_2 w_1^2 & \nabla I_1 \nabla I_2 w_1 w_2 & \nabla I_1 w_1^2 & \nabla I_1 w_1 w_2 \\ \nabla I_1^2 w_1 w_2 & \nabla I_1^2 w_2^2 & \nabla I_1 \nabla I_2 w_1 w_2 & \nabla I_1 \nabla I_2 w_2^2 & \nabla I_1 w_1 w_2 & \nabla I_1 w_2^2 \\ \nabla I_1 \nabla I_2 w_1^2 & \nabla I_1 \nabla I_2 w_1 w_2 & \nabla I_2^2 w_1^2 & \nabla I_2^2 w_1 w_2 & \nabla I_2 w_1^2 & \nabla I_2 w_1 w_2 \\ \nabla I_1 \nabla I_2 w_1 w_2 & \nabla I_1 \nabla I_2 w_2^2 & \nabla I_2^2 w_1 w_2 & \nabla I_2^2 w_2^2 & \nabla I_2 w_1 w_2 & \nabla I_2 w_2^2 \\ \nabla I_1 w_1^2 & \nabla I_1 w_1 w_2 & \nabla I_2 w_1^2 & \nabla I_2 w_1 w_2 & w_1^2 & w_1 w_2 \\ \nabla I_1 w_1 w_2 & \nabla I_1 w_2^2 & \nabla I_2 w_1 w_2 & \nabla I_2 w_2^2 & w_1 w_2 & w_2^2 \end{bmatrix}$$

In at least some embodiments, the update rule is as follows:

$$A^{n+1} = A^n + \Delta A \quad (C21)$$

$$d^{n+1} = d^n + \Delta d \quad (C22)$$

Image Pyramids

Sub-pixel iterations may yield very precise tracking results. However, sub-pixel iterations may not be effective if the transformation is large. In this case, the local gradients may not lead to the true solution and the iterations may get stuck in some local minimum. In at least some embodiments, to overcome this problem of large motions, image pyramids may be used. A basic idea of image pyramids is that motions get smaller when the images are down-sampled. In at least some embodiments, the features are tracked in the smaller images, and the information is propagated back the original image. The tracking may thus be performed with better approximations.

Inverse Compositional Model

In at least some embodiments, at each iteration, the tracking algorithm described above may have to re-compute the image gradients $\nabla J(x_0+w+d)$ since d changes, and may also have to re-collect the matrix and perform the inversion. In the rest of this section, an alternative method is described that only computes the image gradients and the matrix once.

The translation case is addressed first. Assume the current best estimate is $d^n$. In at least some embodiments, the following may be solved:

$$\sum_{w \in W} (I(x_0 + w + \Delta d^n) - J(x_0 + w + d^n))^2. \quad (C23)$$

Taylor expansion gives:

$$I(x_0+w+\Delta d^n) \approx I(x_0+w) - \nabla I(x_0+w) \cdot \Delta d^n. \quad (C24)$$

In at least some embodiments, the optimal $\Delta d^n$ is given by:

$$\Delta d^n \left( \sum_{w \in W} \nabla I(x_0 + w) \nabla I^T(x_0 + w) \right)^{-1} \times \quad (C25)$$

$$\left( \sum_{w \in W} (I(x_0 + w) - J(x_0 + w + d^n)) \nabla I(x_0 + w) \right)$$

In at least some embodiments, $d^n$ may be updated according to:

$$\Delta d^{n+1} = d^n + \Delta d^n. \quad (C26)$$

This model may be referred to as the inverse compositional model because the idea is to compute the transformation on I but apply the inverse transformation on J. This may work only for transformations that form groups, because otherwise the inverse does not exist. However, note that most transformations described herein, such as translations and affine transformations, may form groups, so the inverse compositional model may be applied in at least some embodiments.

In at least some embodiments, the affine case is similar to the translation case. Taylor expansion gives:

$$\Delta I(x_0 + w - (\Delta A w + \Delta d)) \approx \quad (C27)$$

$$I(x_0 + w) - \nabla I(x_0 + w) \begin{bmatrix} w_1 & w_2 & 0 & 0 & 1 & 0 \\ 0 & 0 & w_1 & w_2 & 0 & 1 \end{bmatrix} \cdot \Delta D$$

where again $\Delta D$ is a collection of $\Delta A$ and $\Delta d$. Note that subscripts and superscripts have been dropped for both $\Delta A$ and $\Delta d$.

In at least some embodiments, the optimal $\Delta D$ is given by:

$$\Delta D = \quad (C28)$$

$$\left( \sum_{w \in W} \Delta Q(w) \right)^{-1} \left( \sum_{w \in W} (I(x_0 + w) - J(x_0 + w + A^n w + d^n)) \Delta P(w) \right)$$

where $\Delta P(w)$ is a 2×1 vector defined as follows:

$$\Delta P(w) = \begin{bmatrix} \nabla I_1 w_1 \\ \nabla I_1 w_2 \\ \nabla I_2 w_1 \\ \nabla I_2 w_2 \\ \nabla I_1 \\ \nabla I_2 \end{bmatrix} \quad (C29)$$

where:

$$\nabla I(x_0 \mid w) \Box [\nabla I_1 \quad \nabla I_2]^T.$$

In at least some embodiments, Q(w) is a 2×2 matrix defined as follows:

$$Q(w) = P(w) P^T(w) \quad (C30)$$

$$= \begin{bmatrix} \nabla I_1^2 w_1^2 & \nabla I_1^2 w_1 w_2 & \nabla I_1 \nabla I_2 w_1^2 & \nabla I_1 \nabla I_2 w_1 w_2 & \nabla I_1 w_1^2 & \nabla I_1 w_1 w_2 \\ \nabla I_1^2 w_1 w_2 & \nabla I_1^2 w_2^2 & \nabla I_1 \nabla I_2 w_1 w_2 & \nabla I_1 \nabla I_2 w_2^2 & \nabla I_1 w_1 w_2 & \nabla I_1 w_2^2 \\ \nabla I_1 \nabla I_2 w_1^2 & \nabla I_1 \nabla I_2 w_1 w_2 & \nabla I_2^2 w_1^2 & \nabla I_2^2 w_1 w_2 & \nabla I_2 w_1^2 & \nabla I_2 w_1 w_2 \\ \nabla I_1 \nabla I_2 w_1 w_2 & \nabla I_1 \nabla I_2 w_2^2 & \nabla I_2^2 w_1 w_2 & \nabla I_2^2 w_2^2 & \nabla I_2 w_1 w_2 & \nabla I_2 w_2^2 \\ \nabla I_1 w_1^2 & \nabla I_1 w_1 w_2 & \nabla I_2 w_1^2 & \nabla I_2 w_1 w_2 & w_1^2 & w_1 w_2 \\ \nabla I_1 w_1 w_2 & \nabla I_1 w_2^2 & \nabla I_2 w_1 w_2 & \nabla I_2 w_2^2 & w_1 w_2 & w_2^2 \end{bmatrix}$$

In at least some embodiments, the update for $A^n$ and $d^n$ works as follows:

$$A^{n+1} = A^n + \Delta A \quad (C31)$$

$$d^{n+1} = d^n + \Delta d \quad (C32)$$

Note that by properly choosing the expression for the affine transformation (equation (C10)) an additive update rule may be obtained.

Illumination Correction

In addition to domain deformation, it also may be important to consider intensity change. The following model for intensity changes may be used in at least some embodiments. Assuming h is the deformation used, in at least some embodiments, the illumination correction may be done with an affine model on intensities:

$$I(x_0+w)=\lambda J(h(x_0,w))+\delta \forall w\in W \quad \text{(C33)}$$

In at least some embodiments, parameter estimation may be performed as follows. Define the energy as:

$$E = \sum_{w\in W} (I(x_0+w) - (\lambda J(h(x_0,w)) + \delta))^2 \quad \text{(C34)}$$

Feature Selection

Features may be defined as the points that are trackable according to the chosen algorithm. Therefore, a technique that may be used in at least some embodiments is to find points whose characteristic matrix:

$$\sum_{w\in W} \nabla I(x_0+w) \nabla I^T(x_0+w) \quad \text{(C35)}$$

is invertible. Since this matrix is symmetric and non-negative definite, its smaller eigenvalue just needs to be checked. Note that, for a 2×2 matrix, eigenvalues can be computed analytically.

Feature Tracking Over Time

In at least some embodiments, to track features over long image sequences, the translational and affine models may be combined. A strategy that may be employed in some embodiments is to use the translational model to track between two adjacent frames. The location on the previous frame is given by the tracking result at time t−1. In at least some embodiments, illumination correction may not be used in this step since illumination does not change much between two adjacent frames. However, at least some embodiments may use image pyramids in order to handle large motions. If this step fails, the feature may be declared to be lost. If this step is successful, the affine model may then be used to track against the reference frame starting from the translational result. This is to ensure that there are no drifts. In at least some embodiments, illumination correction may be used in this step since the feature template may have significant changes in illumination. Image pyramids may also be used in this step.

Detecting and Tracking with Primary Colors

In this section, a technique for detecting and tracking a point feature with primary colors is described that may be used in some embodiments. A detection portion of the technique is described first, followed by a description of a tracking portion of the technique.

Detecting with Primary Colors

In at least some embodiments of a detection portion of the technique, assuming RGB images, given a feature template, the energy in each channel may be computed as follows:

$$\begin{cases} E_r = \sum_{x\in W} I_r^2(x) \\ E_g = \sum_{x\in W} I_g^2(x) \\ E_b = \sum_{x\in W} I_b^2(x) \end{cases} \quad \text{(C36)}$$

Equation (C36) computes the sum of square intensity values for each color channel in all pixels in a patch of pixels (the feature template) corresponding to the feature. $E_r$, $E_g$, and $E_b$ may be compared to a threshold. If some but not all of the energy values are below the threshold, this feature is declared to have primary colors. Note that since the feature template does not change over time, in at least some embodiments detection may only be done once for each feature. Also note that the RGB color model or color space is given by way of example, and that the technique may be adapted to apply to other color models or color spaces, including but not limited to the CMYK color model.

Tracking with Primary Colors

The following describes a tracking portion of the technique according to at least some embodiments. Without loss of generality, assume RGB color images, and assume that, for a given feature, the blue channel is detected to be below the threshold. Note that this technique may be adapted to work with any color model or color space and that any number of channels can be below the threshold. Also note that the blue channel is used as a non-limiting example. In at least some embodiments, if all the channels are below the threshold, the feature is not tracked. However, this generally does not occur with appropriate feature selection. In at least some embodiments, the tracking algorithm considers a cost function that does not contain the weak channels, such as:

$$E = \sum_{w\in W} (I_r(x_0+w) - (\lambda_r J_r(h_A(x_0,w)) + \delta_r))^2 + \\ (I_b(x_0+w) - (\lambda_r J_b(h_A(x_0,w)) + \delta_b))^2 \quad \text{(C37)}$$

This cost function may be solved, for example, using an inverse compositional model.

Example Applications

Embodiments of the feature tracking techniques may, for example, be used to establish point trajectories in an image sequence for various embodiments of Structure from Motion (SFM) techniques and algorithms that may be applied, for example, to find the three-dimensional (3D) structures of a scene, for example from a video taken by a moving video camera or from a set of images taken with a still camera. In SFM, a task or goal is to estimate the camera motion (which may, but does not necessarily, have both translation and rotation components) from a set of point correspondences in a set of images or video frames. In addition, in at least some cases, intrinsic camera parameters (e.g., focal length) may also be estimated if not known. Performing the task of estimating camera motion and intrinsic parameters for a frame or a sequence of frames may be referred to as reconstruction. Thus, a reconstruction algorithm or technique (which may also be referred to as an SFM technique) may be implemented and applied to estimate the camera motion and intrinsic parameters for image sequences. Note that a distinct camera may be assumed for each image or frame in an image sequence. Thus, each frame or image in a sequence may be referred to as a "camera."

Embodiments of the feature tracking techniques may, for example, be used to establish point trajectories in an image sequence for various embodiments of a general 3D reconstruction technique. A general 3D reconstruction technique, which may also be referred to as a general SFM technique, is generally directed to performing reconstruction for image sequences in which the camera motion includes a non-zero translation component. The general SFM technique estimates the rotation and translation components of the camera motion, and may also estimate the camera intrinsic parameters (e.g., focal length) if not known. In addition, the general SFM technique may be directed to performing reconstruction for image sequences in which the scene does not contain a dominant plane.

As another example, embodiments of the feature tracking techniques may be used to establish point trajectories in an image sequence for various embodiments of a rotation-based reconstruction technique. A rotation-based reconstruction technique, which may also be referred to as a rotation-based SFM technique, is directed to performing reconstruction for image sequences in which the translation component of the camera motion is zero or near zero. The rotation-based SFM technique may only estimate the rotation component of the camera motion in an image sequence, and may also estimate the camera intrinsic parameters (e.g., focal length) if not known.

As another example, embodiments of the feature tracking techniques may be used to establish point trajectories in an image sequence for various embodiments of a plane-based reconstruction technique. A plane-based reconstruction technique, which may also be referred to as a plane-based SFM technique, is directed to performing reconstruction for image sequences in which the scene includes a dominant plane. The plane-based SFM technique estimates the rotation and translation components of the camera motion, and may also estimate the camera intrinsic parameters (e.g., focal length) if not known.

As another example, embodiments of the feature tracking techniques may be used to establish point trajectories in an image sequence for a selection technique for selecting a particular reconstruction technique to be applied to an image sequence. The selection technique may analyze an input image sequence or set of point trajectories and, based on one or more characteristics of the image sequence, select a reconstruction technique as the appropriate reconstruction technique for the particular image sequence from among a set of reconstruction techniques. For example, the set may include two or more of a rotation-based reconstruction technique, a plane-based reconstruction technique, and a general 3D reconstruction technique as described herein.

Embodiments of the selection technique and of the rotation-based reconstruction technique, plane-based reconstruction technique, and general 3D reconstruction technique may be combined to produce an SFM system that takes as input an image sequence (or a set of point trajectories), selects an appropriate reconstruction technique (e.g., a rotation-based reconstruction technique, a plane-based reconstruction technique, or a general 3D reconstruction technique), and applies the selected reconstruction technique to generate an estimate of camera motion and camera intrinsic parameters (e.g. focal length) for the particular image sequence. Embodiments of the feature tracking techniques may be used to establish point trajectories in an image sequence for the SFM system.

Embodiments of the general 3D reconstruction technique and embodiments of the rotation-based reconstruction technique may both implement embodiments of an adaptive reconstruction algorithm that starts by adaptively determining and reconstructing an initial set of keyframes that covers only a part of an image sequence (e.g., a set of spaced frames somewhere in the middle of the sequence), and that incrementally and adaptively determines and reconstructs additional keyframes to fully cover the image sequence. In at least some embodiments, the adaptive reconstruction algorithm then adaptively determines and reconstructs optimization keyframes to provide a better reconstruction. The rest of the frames in the sequence may then be reconstructed based on the determined and reconstructed keyframes.

At least some embodiments of the adaptive reconstruction algorithm may be configured to handle both cases where the intrinsic camera parameters (e.g., focal length) are known (e.g., via user input or via metadata provided with the input image sequence) and cases where the intrinsic camera parameters are not known. The first case may be referred to herein as the calibrated case, and the second case may be referred to herein as the uncalibrated case. In at least some embodiments, in the calibrated case, a Euclidian (or metric) reconstruction technique may be applied. In at least some embodiments, in the uncalibrated case, a projective reconstruction technique may at least initially be applied. A self-calibration technique is described that may, for example be applied to produce a Euclidian (or metric) reconstruction in the uncalibrated case.

In addition, at least some embodiments of the adaptive reconstruction algorithm may be configured to handle image sequences with either constant (fixed) focal length or varying focal length (e.g., resulting from zooming of the camera lens), in both the calibrated and uncalibrated cases.

Figure 2:
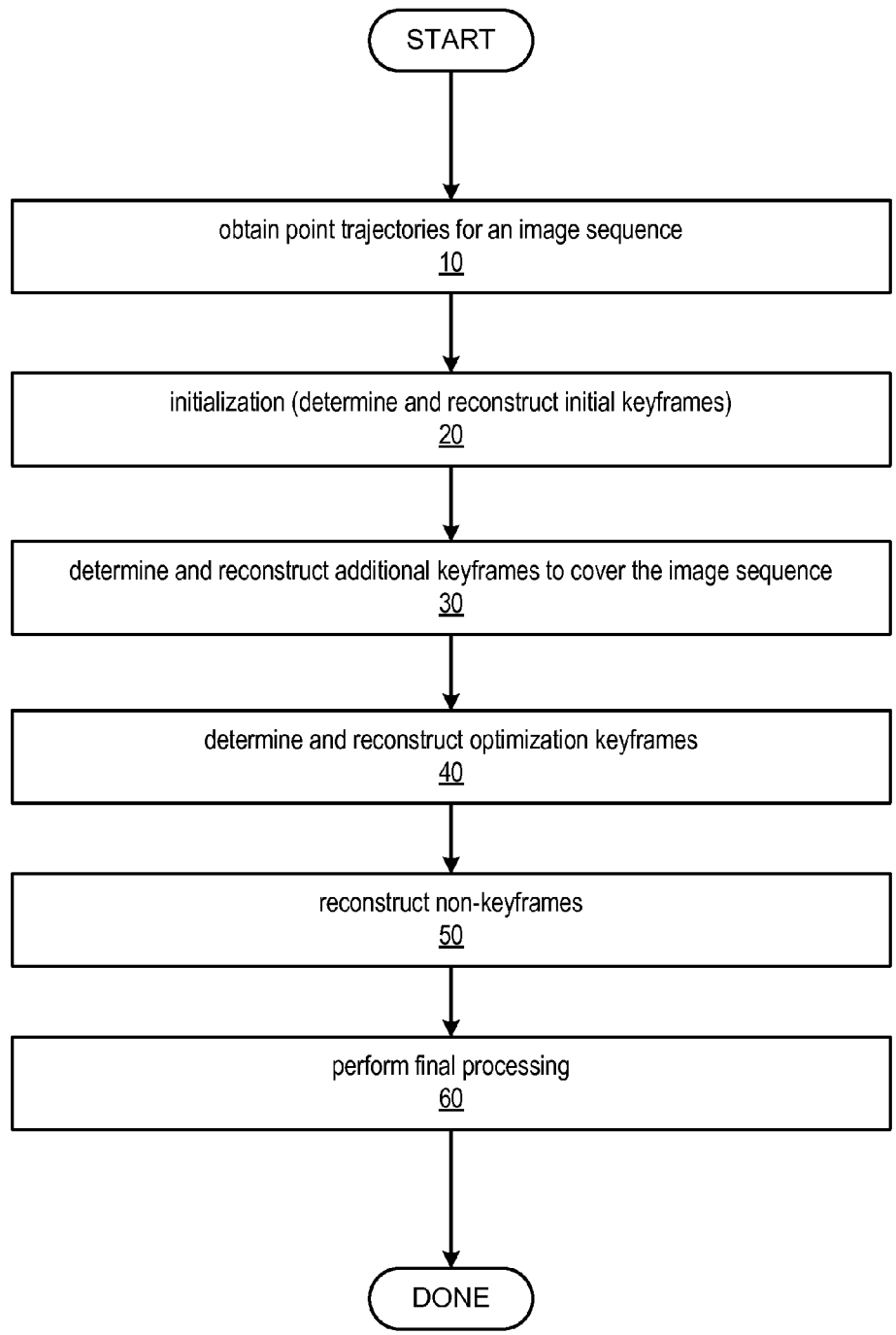
FIG. 2 is a high-level flowchart of a general adaptive reconstruction algorithm, according to at least some embodiments.

FIG. 2 is a high-level flowchart of an adaptive reconstruction algorithm, according to at least some embodiments. As indicated at 10, point trajectories (which may also be referred to as feature trajectories) for an image sequence (e.g., a video sequence, or a set of still photographs) may be obtained. Each point trajectory tracks a feature across two or more of the images in the sequence. Embodiments of the feature tracking techniques described herein may be used to establish the point trajectories in the image sequence. As indicated at 20, an initialization technique may be performed to determine and reconstruct a set of initial keyframes covering a portion of the image sequence according to the point trajectories. As indicated at 30, an adaptive technique may then be performed to iteratively select and reconstruct additional keyframes to cover the image sequence. As indicated at 40, an opt-keyframe technique may then be performed to determine and reconstruct optimization keyframes to improve the quality of the reconstruction. As indicated at 50, non-keyframes (e.g., all frames that have not yet been included in the reconstruction) may be reconstructed. As indicated at 60, final processing may be performed. Output of the algorithm includes at least the camera intrinsic parameters and the Euclidean motion parameters for the images in the sequence.

Example Implementations

Some embodiments may include a means for generating structure and motion for a set of images or frames according to the SFM techniques described herein. For example, an SFM module may obtain or generate a set of point trajectories and generate as output structure and motion for a set of images or frames as described herein. The set of point trajectories may be generated according to an embodiment of the feature tracking techniques described herein. The SFM module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform one or more of the techniques as described herein. Other embodiments of the module(s) may be at least partially implemented by hardware circuitry and/or firmware stored, for example, in a non-volatile memory.

Figure 3:
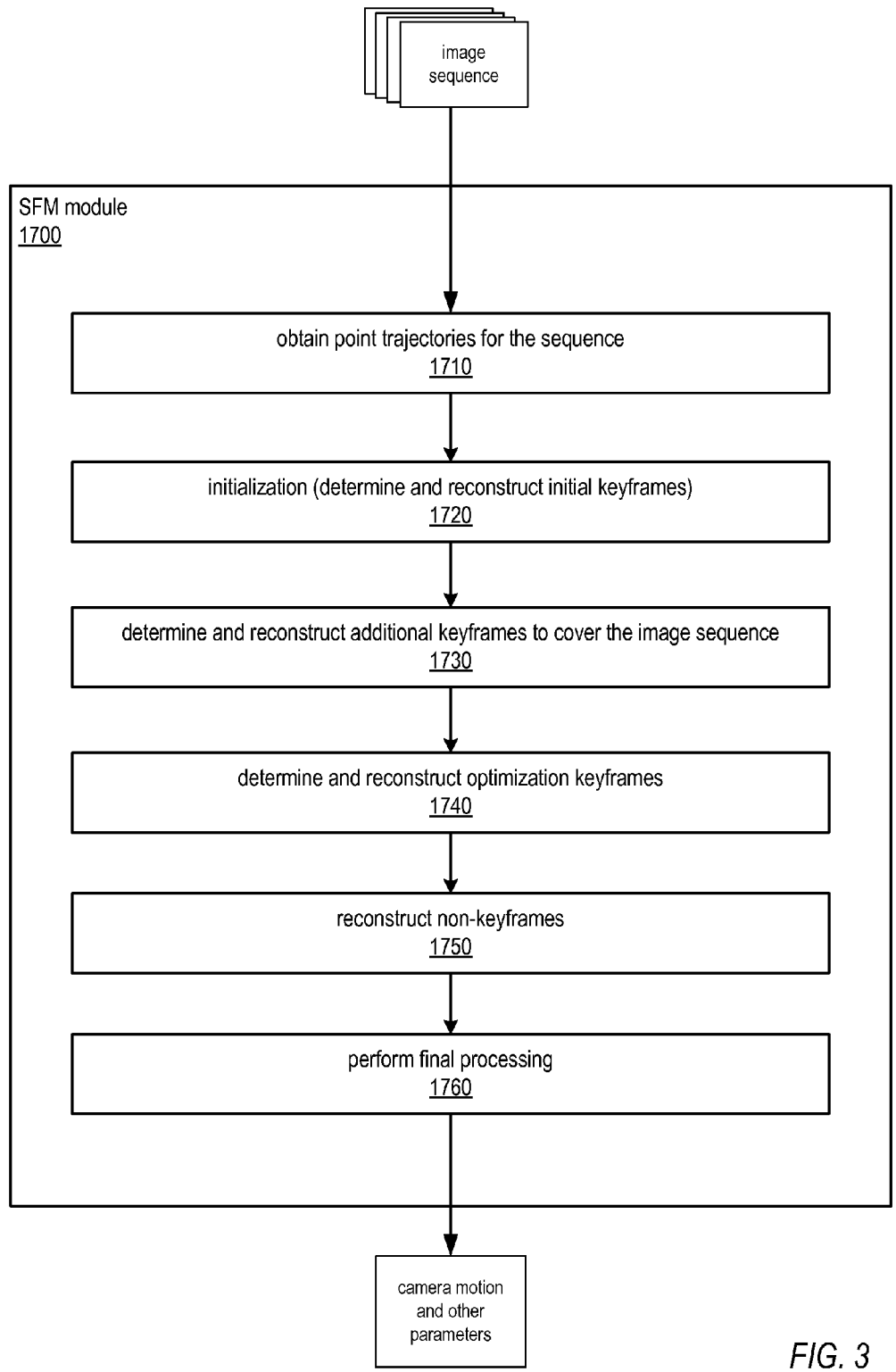
FIG. 3 illustrates a module that may implement one or more of the Structure from Motion (SFM) techniques and algorithms as described herein, according to at least some embodiments.
Figure 5:
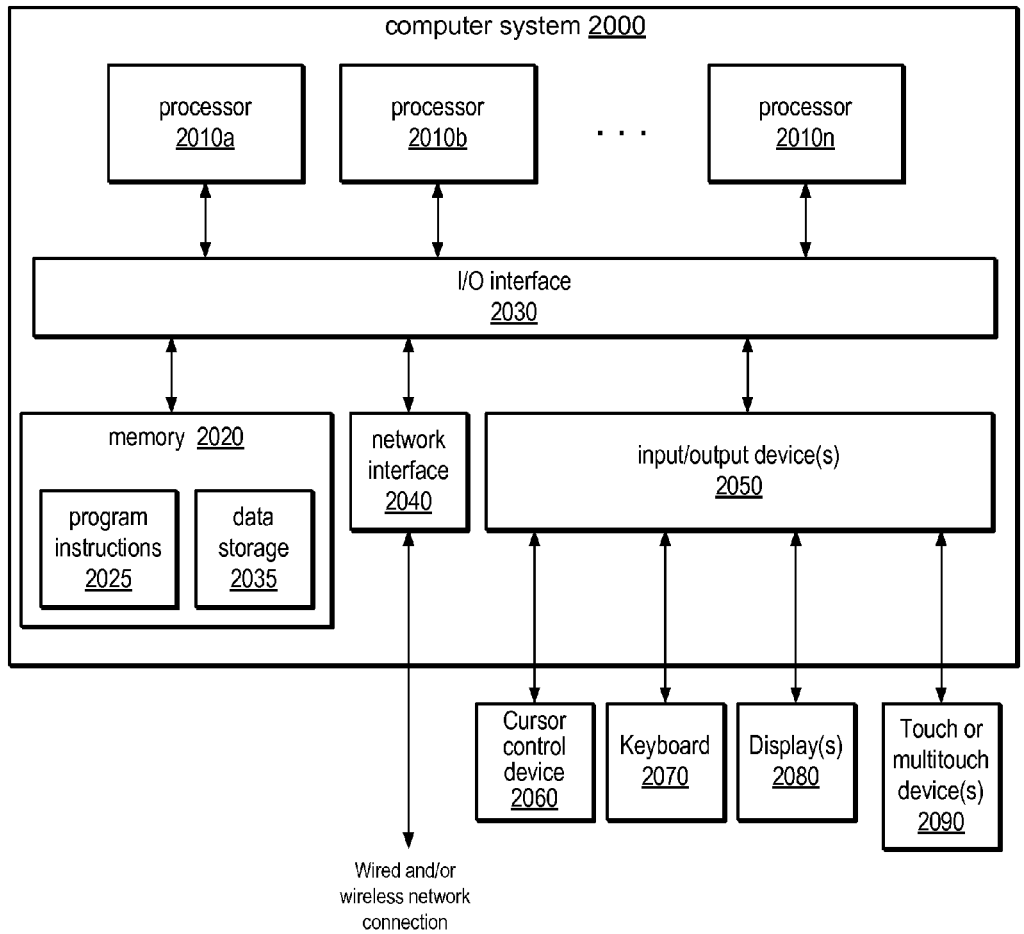
FIG. 5 illustrates an example computer system that may be used in embodiments.

Embodiments of the SFM module and/or components thereof, including but not limited to embodiments of the feature tracking techniques described herein, may, for example, be implemented as a stand-alone application, as a module of an application, as a plug-in or plug-ins for applications including image or video processing applications, and/or as a library function or functions that may be called by other applications such as image processing or video processing applications. Embodiments of the module and/or components thereof, including but not limited to embodiments of the feature tracking techniques described herein, may be implemented in any image or video processing application, or more generally in any application in which video or image sequences may be processed. Example applications in which embodiments may be implemented may include, but are not limited to, Adobe® Premiere® and Adobe® After Effects®. "Adobe," "Adobe Premiere," and "Adobe After Effects" are either registered trademarks or trademarks of Adobe Systems Incorporated in the United States and/or other countries. An example module that may implement one or more of the techniques including but not limited to embodiments of the feature tracking techniques described herein is illustrated in FIG. 3. An example computer system on which the module and/or components thereof, including but not limited to embodiments of the feature tracking techniques described herein, may be implemented is illustrated in FIG. 5. Note that the module and/or components thereof, including but not limited to embodiments of the feature tracking techniques described herein, may, for example, be implemented in still cameras and/or video cameras.

FIG. 3 illustrates a module that may implement an SFM technique as illustrated in the accompanying Figures and described herein, according to at least some embodiments. Module 1700 may, for example, obtain an input image sequence, or alternatively may obtain or generate a set of point trajectories for the images in a sequence according to an embodiment of the feature tracking techniques described herein. Module 1700 then applies one or more techniques to generate structure, camera parameters, and motion. In at least some embodiments, module 1700 may obtain or generate point trajectories for the sequence according to the feature tracking techniques described herein, as indicated at 1710. Module 1700 may then perform initialization to determine and reconstruct initial keyframes, as indicated at 1720. Module 1700 may then determine and reconstruct additional keyframes to cover the video sequence, as indicated at 1730. Module 1700 may then determine and reconstruct optimization keyframes, as indicated at 1740. Module 1700 may then reconstruct non-keyframes, as indicated at 1750. Module 1700 may then perform final processing, as indicated at 1760. In at least some embodiments, module 1700 may generate as output estimates of camera parameters and camera motion for the image sequence.

Figure 4:
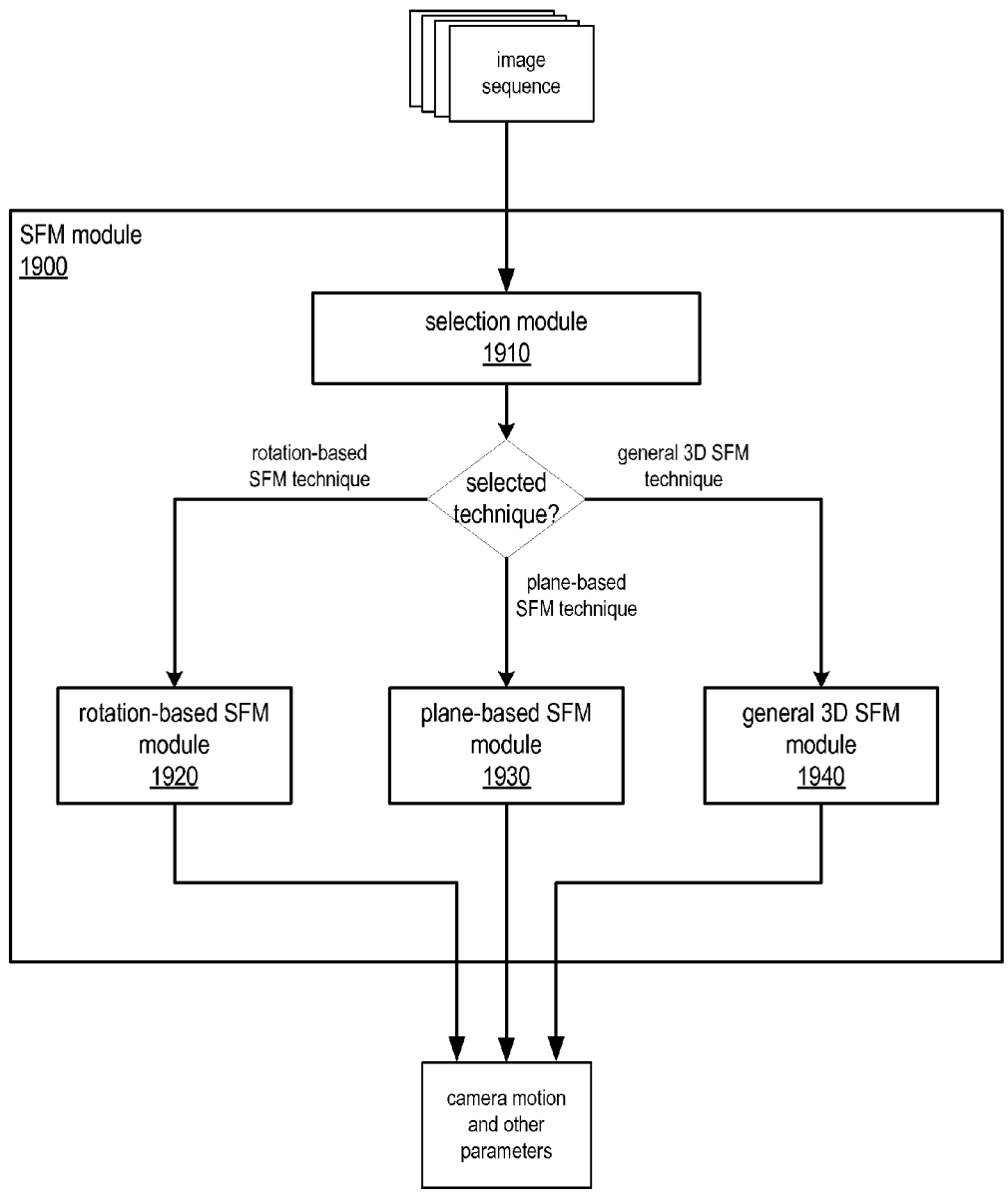
FIG. 4 illustrates a module that may implement and select from multiple SFM techniques, according to at least some embodiments.

FIG. 4 illustrates a module that may implement and select from multiple SFM techniques as illustrated in the accompanying Figures and described herein, according to at least some embodiments. An example computer system on which the module may be implemented is illustrated in FIG. 5. SFM module 1900 may include a selection module 1910 that may implement a selection technique as described herein, a rotation-based SFM module 1920 that may implement a rotation-based reconstruction technique as described herein, a plane-based SFM module 1930 that may implement a plane-based reconstruction technique as described herein, and a general 3D SFM module 1940 that may implement a general 3D reconstruction technique as described herein. SFM module 1900 may, for example, receive an input image sequence, or alternatively may obtain or generate a set of point trajectories for the images in a sequence according to an embodiment of the feature tracking techniques described herein. The selection module 1910 may analyze the input and, based on one or more characteristics of the image sequence, select a rotation-based SFM technique, a plane-based SFM technique, or a general 3D SFM technique as the appropriate reconstruction technique for the particular image sequence. The module that implements the selected reconstruction technique (the rotation-based SFM module 1920, plane-based SFM module 1930, or general 3D SFM module 1940) is then applied to generate estimates of camera parameters and camera motion for the image sequence.

Example Applications

Example applications of the SFM techniques as described herein, including but not limited to embodiments of the feature tracking techniques, may include one or more of, but are not limited to, video stabilization, video augmentation (augmenting an original video sequence with graphic objects), video classification, and robot navigation. In general, embodiments of one or more of the SFM techniques may be used to provide structure and motion to any application that requires or desires such output to perform some video- or image-processing task.

Example System

Embodiments of the various techniques as described herein including but not limited to the feature tracking techniques and the reconstruction techniques for generating structure, camera parameters, and motion from point trajectories may be executed on one or more computer systems, which may interact with various other devices. One such computer system is illustrated by FIG. 5. In different embodiments, computer system 2000 may be any of various types of devices, including, but not limited to, a personal computer system, desktop computer, laptop, notebook, or netbook computer, mainframe computer system, handheld computer, workstation, network computer, a camera, a video camera, a tablet or pad device, a smart phone, a set top box, a mobile device, a consumer device, video game console, handheld video game device, application server, storage device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, display(s) 2080, and touch- or multitouch-enabled device(s) 2090. In some embodiments, it is contemplated that embodiments may be implemented using a single instance of computer system 2000, while in other embodiments multiple such systems, or multiple nodes making up computer system 2000, may be configured to host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, be implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the techniques disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may be configured to store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the various techniques as described herein are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a computer-accessible medium may include storage media or memory media such as magnetic or optical media, e.g., disk or CD/DVD-ROM coupled to computer system 2000 via I/O interface 2030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 5, memory 2020 may include program instructions 2025, configured to implement embodiments of the various techniques as described herein, and data storage 2035, comprising various data accessible by program instructions 2025. In one embodiment, program instructions 2025 may include software elements of embodiments of the various techniques as illustrated in the above Figures. Data storage 2035 may include data that may be used in embodiments. In other embodiments, other or different software elements and data may be included.

Those skilled in the art will appreciate that computer system 2000 is merely illustrative and is not intended to limit the scope of the various techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a video camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method implemented by one or more computing devices to improve feature tracking through an image sequence, the method comprising:
    tracking one or more features in the image sequence including a plurality of frames by the one or more computing devices, the tracking including detecting the one or more features in the image sequence by the one or more computing devices, the detecting including, for each feature:
        computing an energy value for one or more color channels of the feature in at least one frame of the image sequence by the one or more computing devices; and
        comparing the computed energy value for the one or more color channels to a threshold by the one or more computing devices; and
        for at least one detected feature, tracking the respective feature by the one or more computing devices according to at least one color channel for which the respective energy value is determined to be above the threshold such that at least one other color channel for which the respective energy value is determined to be below the threshold is not used in said tracking by the one or more computing devices.

2. The method as recited in claim 1, wherein the computing an energy value for the one or more color channels of the feature in at least one frame of the image sequence includes computing a sum of square intensity values for each color channel in pixels in a patch of pixels corresponding to the respective feature by the one or more computing devices.

3. The method as recited in claim 1, further comprising, for at least one other detected feature:
    determining that the energy values for the one or more color channels is above the threshold by the one or more computing devices; and
    in response to said determining, tracking the respective feature according to the one or more color channels by the one or more computing devices.

4. The method as recited in claim 1, further comprising, for at least one other feature:
    determining that the energy values for the one or more color channels is below the threshold by the one or more computing devices; and
    in response to said determining, not tracking the respective feature by the one or more computing devices.

5. The method as recited in claim 1, wherein said tracking the respective feature according to at least one color channel for which the respective energy value is determined to be above the threshold includes evaluating a cost function by the one or more computing devices that includes the at least one color channel for which the respective energy value is determined to be above the threshold but does not include the at least one other color channel for which the respective energy value is determined to be below the threshold.

6. The method as recited in claim 1, wherein a feature is detected if the computed energy value for at least one color channel is determined by the one or more computing devices to be above the threshold.

7. The method as recited in claim 1, wherein a feature is discarded and not tracked by the one or more computing devices if the computed energy value for the one or more color channels is determined by the one or more computing devices to be below the threshold.

8. The method as recited in claim 1, wherein a feature is detected and determined by the one or more computing devices to have primary color if the computed energy value for at least one color channel is determined by the one or more computing devices to be above the threshold and the energy value for at least one other color channel is determined by the one or more computing devices to be below the threshold.

9. A system, comprising:
    one or more processors; and
    a memory comprising program instructions, the program instructions are executable by at least one of the one or more processors to perform operations comprising:
        tracking one or more features in an image sequence including a plurality of frames by one or more computing devices, the tracking including detecting the one or more features in the image sequence, the detecting including, for each feature:
            computing an energy value for one or more color channels of the feature in at least one frame of the image sequence; and
            comparing the computed energy value for the one or more color channels to a threshold; and
            for at least one detected feature, tracking the respective feature according to at least one color channel for which the respective energy value is determined to be above the threshold such that at least one other color channel for which the respective energy value is determined to be below the threshold is not used in said tracking.

10. The system as recited in claim 9, wherein the computing an energy value for the one or more color channels of the feature in at least one frame of the image sequence includes computing a sum of square intensity values for each color channel in pixels in a patch of pixels corresponding to the respective feature.

11. The system as recited in claim 9, further comprising, for at least one other detected feature:
determining that the energy values for the one or more color channels is above the threshold; and
in response to said determining, tracking the respective feature according to the one or more color channels.

12. The system as recited in claim 9, further comprising, for at least one other feature:
determining that the energy values for the one or more color channels is below the threshold; and
in response to said determining, not tracking the respective feature.

13. The system as recited in claim 9, wherein said tracking the respective feature according to at least one color channel for which the respective energy value is determined to be above the threshold includes evaluating a cost function that includes the at least one color channel for which the respective energy value is determined to be above the threshold but does not include the at least one other color channel for which the respective energy value is determined to be below the threshold.

14. The system as recited in claim 9, wherein a feature is detected if the computed energy value for at least one color channel is determined to be above the threshold.

15. The system as recited in claim 9, wherein a feature is discarded and not tracked if the computed energy value for the one or more color channels is determined to be below the threshold.

16. The system as recited in claim 9, wherein a feature is detected and determined to have primary color if the computed energy value for at least one color channel is determined to be above the threshold and the energy value for at least one other color channel is determined to be below the threshold.

17. A non-transitory computer-readable storage medium storing program instructions, the program instructions are computer-executable by one or more computing devices to perform feature tracking of one or more features within an image sequence for use in a structure from motion technique, the feature tracking operations comprising:
tracking the one or more features in the image sequence including a plurality of frames, the tracking including detecting the one or more features in the image sequence, the detecting including, for each feature:
computing an energy value for one or more color channels of the feature in at least one frame of the image sequence; and
comparing the computed energy value for the one or more color channels to a threshold; and
for at least one detected feature, tracking the respective feature according to at least one color channel for which the respective energy value is determined to be above the threshold such that at least one other color channel for which the respective energy value is determined to be below the threshold is not used in said tracking.

18. The computer-readable storage medium as recited in claim 17, wherein the computing an energy value for the one or more color channels of the feature in at least one frame of the image sequence includes computing a sum of square intensity values for each color channel in pixels in a patch of pixels corresponding to the respective feature.

19. The computer-readable storage medium as recited in claim 17, further comprising, for at least one other detected feature:
determining that the energy values for the one or more color channels is above the threshold; and
in response to said determining, tracking the respective feature according to the one or more color channels.

20. The computer-readable storage medium as recited in claim 17, further comprising, for at least one other feature:
determining that the energy values for the one or more color channels is below the threshold; and
in response to said determining, not tracking the respective feature.

* * * * *